US007916665B2

(12) United States Patent
Le Bars et al.

(10) Patent No.: US 7,916,665 B2
(45) Date of Patent: Mar. 29, 2011

(54) METHOD AND DEVICE FOR BUILDING OF A NETWORK CODING SCHEME FOR DATA TRANSMISSION, CORRESPONDING COMPUTER PROGRAM PRODUCT AND STORAGE MEANS

(75) Inventors: Philippe Le Bars, Thorigne Fouillard (FR); Julien Sevin, Saint Aubin du Cormier (FR)

(73) Assignee: Canon Kabushiki Kaisha, Tokyo (JP)

(*) Notice: Subject to any disclaimer, the term of this patent is extended or adjusted under 35 U.S.C. 154(b) by 226 days.

(21) Appl. No.: 12/406,162

(22) Filed: Mar. 18, 2009

(65) Prior Publication Data

US 2009/0238097 A1 Sep. 24, 2009

(30) Foreign Application Priority Data

Mar. 18, 2008 (FR) .................................... 08 51749

(51) Int. Cl.
*H04L 12/28* (2006.01)

(52) U.S. Cl. ....................................... 370/254; 370/252

(58) Field of Classification Search .................. 370/252, 370/352, 353, 217, 334; 709/226, 227
See application file for complete search history.

(56) References Cited

U.S. PATENT DOCUMENTS

| | | | | |
|---|---|---|---|---|
| 6,097,696 | A * | 8/2000 | Doverspike | 370/216 |
| 6,877,125 | B2 | 4/2005 | Le Bars et al. | 714/755 |
| 6,898,251 | B2 | 5/2005 | Le Bars et al. | 375/295 |
| 7,190,730 | B2 | 3/2007 | Ehrmann | 375/260 |
| 7,239,629 | B1 * | 7/2007 | Olshansky et al. | 370/353 |
| 7,392,454 | B2 | 6/2008 | Piret et al. | 714/752 |
| 7,392,461 | B2 | 6/2008 | Piret et al. | 714/785 |
| 7,398,456 | B2 | 7/2008 | Piret et al. | 714/781 |
| 7,404,134 | B2 | 7/2008 | Le Bars et al. | 714/752 |
| 7,424,070 | B2 | 9/2008 | Le Bars et al. | 375/340 |
| 7,461,329 | B2 | 12/2008 | Piret et al. | 714/799 |
| 7,464,323 | B2 | 12/2008 | Piret et al. | 714/781 |
| 7,502,988 | B2 | 3/2009 | Piret et al. | 714/784 |
| 7,545,736 | B2 * | 6/2009 | Dziong et al. | 370/217 |
| 7,656,813 | B2 * | 2/2010 | Kloper | 370/252 |
| 7,689,693 | B2 * | 3/2010 | Doshi et al. | 709/226 |
| 2004/0095907 | A1 * | 5/2004 | Agee et al. | 370/334 |
| 2005/0010675 | A1 | 1/2005 | Jaggi et al. | 709/232 |

(Continued)

OTHER PUBLICATIONS

Ford, Jr. et al. "Maximal Flow Through A Network," Canadian Journal of Mathematics, vol. VIII, No. 3, p. 399-404, 1956.

(Continued)

*Primary Examiner* — Thong H Vu
(74) *Attorney, Agent, or Firm* — Fitzpatrick, Cella, Harper & Scinto

(57) ABSTRACT

A method provides for building a network coding scheme for the transmission of data between multiple source nodes and multiple destination nodes in a communications network having multiple nodes. The method includes the steps of: for each destination node, determining a first set of source nodes from which there exist disjointed paths, in the communications network, to reach the destination node; determining a second set of source nodes which is the intersection of the first determined sets for the destination nodes; and determining a sub-network for implementing the network coding. The sub-network includes source nodes which belong only to the second set of source nodes, the multiple destination nodes, and nodes included in the disjointed paths connecting the source nodes of the second set of source nodes and the destination nodes. The method also includes the step of building a network coding scheme based on the determined sub-network.

13 Claims, 10 Drawing Sheets

Figure 3A:
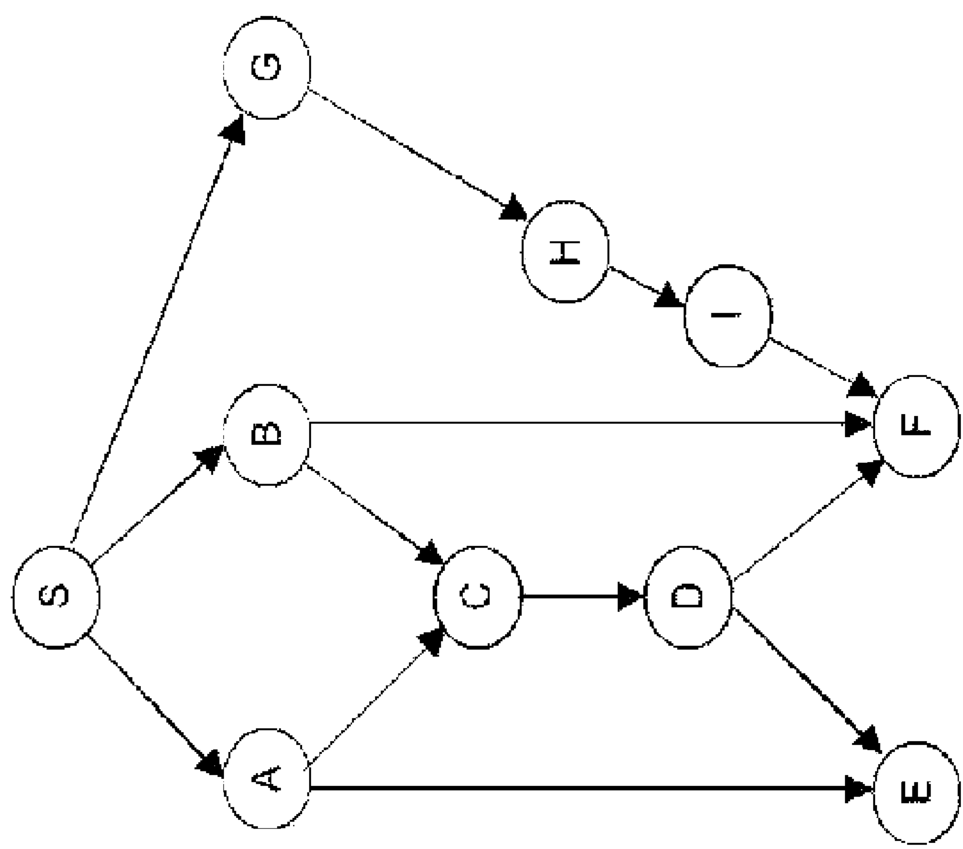

S
A
B
G
C
H
D
I
E
F

U.S. PATENT DOCUMENTS

| | | | | |
|---|---|---|---|---|
| 2005/0015391 | A1 | 1/2005 | Pohlan | 707/100 |
| 2005/0152391 | A1 | 7/2005 | Effros et al. | 370/432 |
| 2008/0002669 | A1 * | 1/2008 | O'Brien et al. | 370/352 |
| 2008/0267106 | A1 * | 10/2008 | Buddhikot et al. | 370/312 |
| 2008/0270873 | A1 | 10/2008 | Piret et al. | 714/784 |
| 2009/0037789 | A1 | 2/2009 | Frouin et al. | 714/752 |
| 2009/0094618 | A1 * | 4/2009 | Huntsman | 719/318 |
| 2009/0106630 | A1 | 4/2009 | Le Bars et al. | 714/780 |
| 2009/0319672 | A1 * | 12/2009 | Reisman | 709/227 |

OTHER PUBLICATIONS

Ahlswede, et al., "Network Information Flow," IEEE Transactions on Information Theory, vol. 46, No. 4, p. 1204-1216, Jul. 2000.

Koetter, Ralf, "An Algebraic Approach to Network Coding," IEEE/ACM Transactions on Networking, vol. 11, No. 5, p. 782-795, Oct. 2003.

Katti, et al., "XORs in The Air: Practical Wireless Network Coding," SIGCOMM '06, Pisa, Italy, p. 243-254, Sep. 11-15, 2006.

* cited by examiner

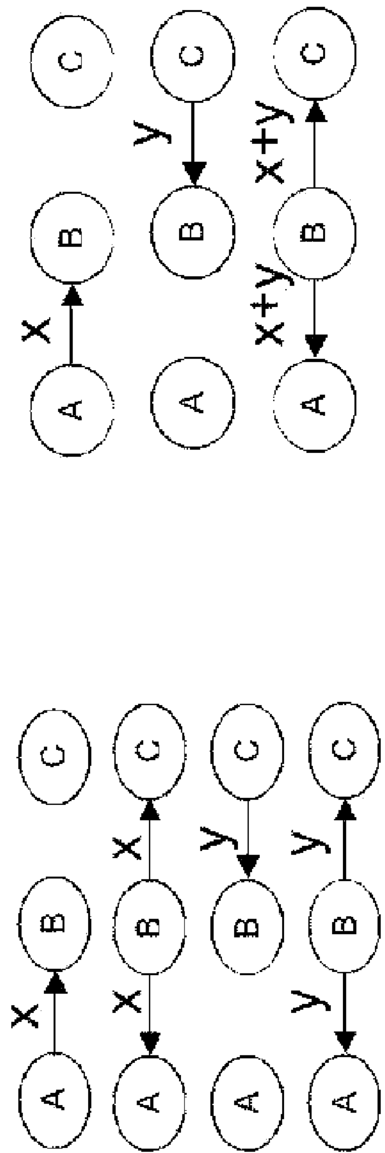
Figure 1a
(prior art)
Figure 1b
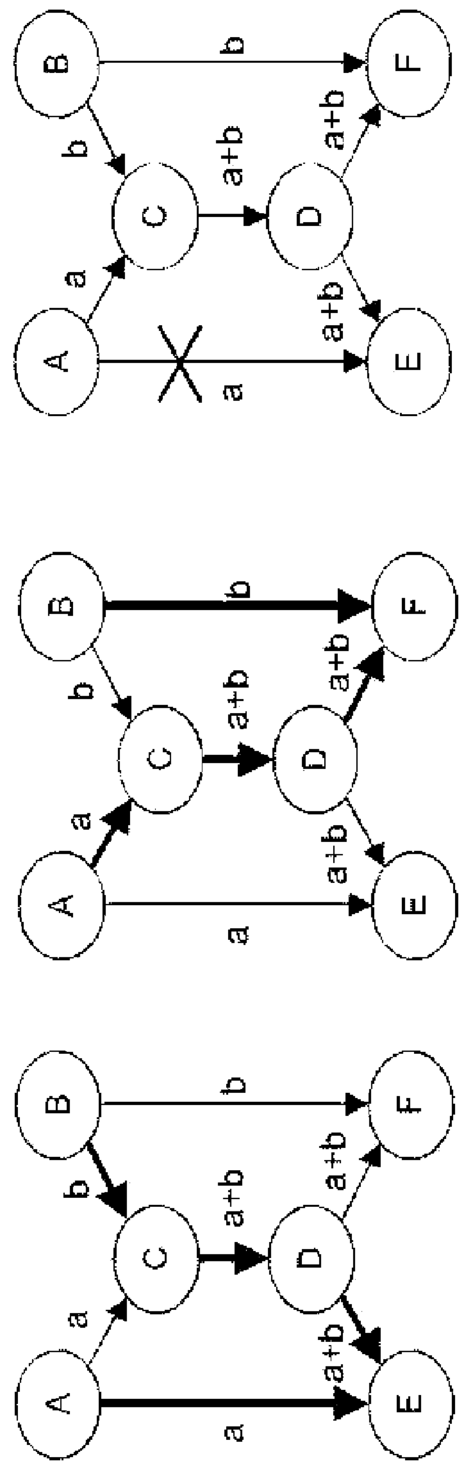
Figure 2a
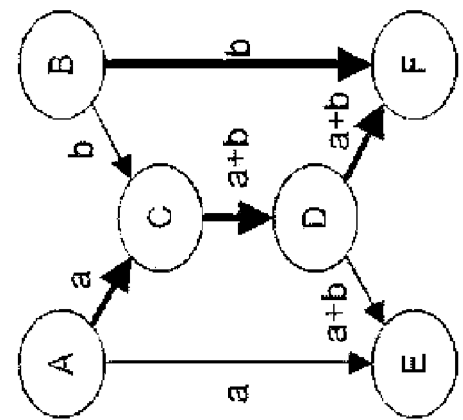
Figure 2b
(prior art)
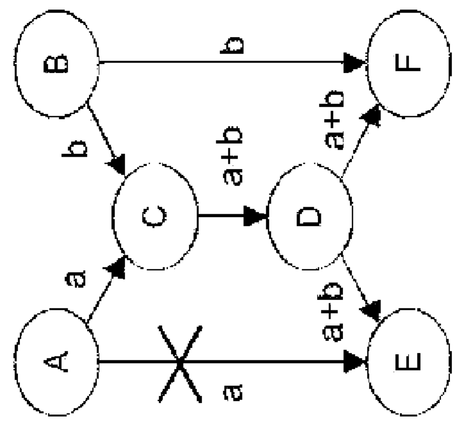
Figure 2c

METHOD AND DEVICE FOR BUILDING OF A NETWORK CODING SCHEME FOR DATA TRANSMISSION, CORRESPONDING COMPUTER PROGRAM PRODUCT AND STORAGE MEANS

1. FIELD OF THE INVENTION

The field of the invention is that of the techniques of network coding (sometimes also called coding on network), i.e. techniques related to information theory and using codes that fulfill the information-transportation capacity of a network.

More specifically, the invention relates to a technique for building a network coding system adapted to the transmission of data between a plurality of source nodes and a plurality of destination nodes in a communications network comprising a plurality of nodes.

The invention can be applied especially but not exclusively in a shared-medium context. In such a context, the invention applies to information transport systems such as wireless networks in which all the members use a same frequency band accessed using a time-division multiplexing (TDM) or sets of computers sharing a common bus.

Network coding techniques are very recent and have not yet found commercial application except for the "Avalanche" (registered mark) system proposed by Microsoft Corporation. Trials on wireless networks however have been made with encouraging results (see: S. Katti, H. Rahul, W. Hu, D. Katabi, M. Médard, J Crowcroft, "*XORs in the air: Practical Wireless Network Coding*". SIGCOMM 2006).

It will be noted that when designing a network coding it is of great importance to have an appropriate adaptation between the network and the used coding in order to avoid a significant degradation of transmitted information. Indeed, in case of incorrect adaptation, instead of receiving information that is partially exploitable, certain nodes may receive only non-exploitable information.

2. TECHNOLOGICAL BACKGROUND

2.1 General Principle of Network Coding

It is possible, through a simple observation, to understand what is at stake in network coding applied to meshed networks. Here below, a quick illustration is provided of the gain given by a network coding. A communications network can be modeled by a directed graph with several arcs going from one vertex to another. A vertex without a finishing arc is called a source of the network. An arc represents a communications channel with the capacity of one information unit per time unit, without prejudging the issue of whether several channels can communicate at the same time.

Referring now to FIGS. 1*a* and 1*b*, a classic (and pedagogical) example of network coding is presented. A wireless network is formed by nodes A, B and C. A and C are far too distant and have to use B as a communications relay. Without network coding (in the case of FIG. 1*a*) four successive media would have to be used (because in this example a same physical channel is shared for A, B and C) to communicate from A to C and then from C to A. On the other hand, with simple network coding (the case of FIG. 1*b*) performed on the relay B using bit-by-bit addition of the information received from A and C, and then transmission of this sum simultaneously to A and C, it can be seen that A and C, with their own information being known, can deduce the information intended for them from the sum received. The medium has to be taken three times in succession. The result of this is a gain in capacity of the network, and a gain in latency.

FIGS. 2*a*, 2*b* and 2*c* illustrate the problem of implementing a network coding, where FIGS. 2*a* and 2*b* correspond to a well adapted network coding whereas FIG. 2*c* corresponds to an incorrectly adapted one. In this example, the transmissions are considered to occur without delay. The network considered, called a butterfly network, comprises two source nodes A and B, two relay nodes C and D, and two destination nodes E and F. FIG. 2*a* shows that there are two disjointed paths from the source nodes A and B to the destination node E: one path starts from A and goes directly to E, the other goes from A and goes through C and D before reaching E. Node E is thus able to retrieve pieces of information "a" and "b". FIG. 2*b* shows that there are two disjointed paths from the source nodes A and B to the destination node F: one starts from B and goes directly to F, the other starts from A and passes through C and D before reaching F. Node F is thus also able to retrieve pieces of information "a" and "b". FIG. 2*c* shows that if the link between the nodes A and E no longer has the capacity to pass a piece of information ("a"), the destination node E will receive a piece of encoded information ("a+b") coming from D which it will never be able to decode.

2.2 The Usable Network Codes

Not all the nodes of a network necessarily take part in a significant coding operation. They may carry out trivial coding, that is they may take incoming data elements and retransmit them. A combining node is the term applied to a node of the network that forms a non-trivial operation on the incoming data.

As we have seen in the above-mentioned examples, a simple code consists of the bit-by-bit addition of data. It follows immediately from this that a linear combination applied to the data coming from the incoming arcs can be used at each encoding node and that a multiplier coefficient can be assigned to each arc going out of the encoding node. At the receiver, if the node knows the various linear combinations used by the "combining" nodes, the decoding is done by applying the inverse matrix formed by the coefficients used in the linear combinations. Naturally, these linear combinations need to be independent.

Furthermore, a node may receive a piece of information which is itself a linear combination of information coming from parent nodes in the hierarchy. The assigning of the nodes must take account of these necessities. Since the data to be transmitted is generally a packet of binary elements or bits having a length $q-1$, the packets are likened to finite fields with $2^q$ elements. The coefficients of the linear combinations too are chosen in the same finite field.

Koetter and Médard have explained the way to build a network coding scheme (see: "An Algebraic Approach to Network coding" ACM transactions on Networking, Vol 11, No 5, October 2003.). We consider an oriented graph $G=(S, E)$. S is the set of vertices of this graph. E is the set of arcs of this graph, i.e. the set of pairs of $S \times S$ which are connected. Let x be the vector representing the data coming from sources at the same point in time. Let z be the vector representing the incoming data entering the receivers at the same point in time. The network is deemed to be without delay, i.e. there is a matrix M such that $z=xM$. Let F be the matrix of a adjacency associated with the network but modified in the sense that coefficients replace the "1"s that are normally used to mark the presence of an arc. We then define a matrix A and a matrix B which take account of the coefficients on the arcs entering the network portion considered and the coefficients on the outgoing arcs. The transfer matrix M of the system associated with the network is $M=A(I-F)^{-1}B^T$, where I is the identity matrix of the dimension cardinal (E) x cardinal (E). The coefficients (matrices A and B) are chosen in a large-sized finite field so that the determinant of the matrix M is not zero.

Koetter and Médard have also proposed a method in the US patent application 2005/015391 in which the coefficients of the matrix are drawn randomly and then transmitted through the entire network to be made known to all the nodes of the network. This method can be applied to networks of unknown topology. The chances of success depend on the cardinal number of the finite field in which the coefficients are chosen randomly.

2.3 Possibility of Network Coding

The US patent application 2005/0010675 proposes a method to build a network coding scheme that applies the prior art described here above to error-free networks with a single source seeking to transmit the same information to several destinations. It produces a solution for the case of an acyclic network with zero delay. It is based on the work of Ahlswede and uses the Ford Fulkerson algorithm (cf "*Maximum Flow through a Network*" Canadian Journal of Mathematics, 8, pp 399-404, 1956) to create sub-graphs.

Prior work by Ahlswede and al. in 2000 (see article: R. Ahlswede, N. Cai, S.-Y. R. Li and R. W. Yeung "*Network Information Flow*" I.E.E.E. Transactions on Information Theory Vol 46, No 4, pp 1204-1216, July 2000) already contained a major theorem of existence: "let S be the set of sources of a network; let R be the set of receivers of this network; let G be the graph associated with this network; in G there are h disjointed paths (i.e. paths that do not have an arc in common) (Si,Rj) for $1 \leqq i \leqq h$, for a given receiver Rj, with $1 \leqq j \leqq card(R)$; then if the number of sources is equal to h (multicasting capacity of the network), there is a multicasting with a throughput h because of the network coding (being assumed that a link has a capacity of one)". The problem therefore lies in testing the graph that represents the network to establish the number of disjointed paths.

Ford and Fulkerson's operational search algorithm is well known for resolving problems of transport, especially to determine the maximum flow between a source and a sink. It is also well known in the prior art that this algorithm can be used to obtain the number of disjointed paths (see Appendix).

The US patent application US2005/0010675 mentioned here above, which is a known solution pertaining to network coding uses this algorithm. However, this known solution has several drawbacks.

One drawback of this known solution is that, even if its authors assert that it can be easily extended, the algorithms presented do not take account of the case of a shared medium which obviously entails the existence of delays. It is easy to prove that their method fails for a shared medium, especially in the computation of multicast capacity.

Another drawback of this known solution is that it does not account of the existence of multiple multicast sources.

Furthermore, and more generally, no known technique of network coding is proposed when the number of sources is strictly greater than h (multicast capacity of the network), i.e. when the condition of the above-mentioned theorem is not respected.

3. GOALS OF THE INVENTION

More specifically, it is a goal of at least one embodiment of the invention to provide a technique for building a network coding that can be implemented, if the topology of the network allows it, whatever the number of source nodes in a network and whatever the value of the multicast capacity of this network.

At least one embodiment of the invention is also aimed at providing a technique of this kind that can be applied to a communications network comprising a shared medium.

It is another goal of at least one embodiment of the invention to provide a technique of this kind that is simple to implement and costs little.

4. SUMMARY OF THE INVENTION

One particular embodiment of the invention proposes a method for building a network coding scheme adapted to the transmission of data between a plurality of source nodes and a plurality of destination nodes in a communications network comprising a plurality of nodes, said method comprising the following steps:

- for each destination node, determining a first set of source nodes from which there exist disjointed paths, in said communications network, to reach said destination node;
- determining a second set of source nodes which is the intersection of the first determined sets for said destination nodes;
- determining a sub-network for implementing the network coding comprising:
  - source nodes which belong only to the second set of source nodes,
  - the plurality of destination nodes, and
  - nodes included in the disjointed paths connecting the source nodes of said second set of source nodes and said destination nodes; and
- building a network coding scheme based on said determined sub-network.

Thus, in this particular embodiment, the invention relies on a wholly novel and inventive approach consisting of the determining of a sub-network that can support a network coding, i.e. a sub-system for which the following condition of the above mentioned theorem is verified: "the number of sources is smaller than or equal to h (multicast capacity of the network)". The determining of this sub-network is based on the determining of the intersection of the first sets of source nodes (each first set comprising source nodes can attain a given destination node with disjointed paths).

It must be noted that for certain topologies of the network, it may happen that no sub-network can be determined and therefore that no network coding can be built.

Advantageously, the cardinal number of each first set of source nodes is the maximum.

Thus, the number of source nodes of the second set (resultant of the intersection) is optimized (maximized) and the quality of the network coding built is improved (since it implies a sub-network comprising more source nodes).

In one particular embodiment, said method comprises a step for obtaining a predetermined sequence order indicating the order in which said nodes can access a shared medium included in the communications network, and said step for determining a first set of source nodes for each destination node comprises the following steps:

- verifying, for each disjointed path from one of the source nodes up to said destination node, that the order of the nodes forming said disjointed path is consistent with said predetermined sequence order;
- obtaining said first set of source nodes in taking only source nodes included in disjointed paths having undergone a positive verification.

Thus, in this particular embodiment of the invention, the proposed technique is adapted to a network comprising a shared medium, through the taking into account of the notion of an order of sequence of access of the nodes to this shared medium.

Advantageously, said step for determining a first set of source nodes, for each destination node, comprises a step for determining the disjointed paths, based on the Ford Fulkerson search algorithm modified to take account of said step of verification of consistency with the predetermined sequence order.

Thus, in adapting the Ford Fulkerson search algorithm, the advantages associated with it are obtained. At the same time, the invention remains in the context of a shared medium.

According to an advantageous characteristic, said step for building a network coding comprises the following steps:

a) determining a matrix of adjacency of said sub-networks;
b) determining an coding matrix from said adjacency matrix;
c) determining a system matrix for each destination node from said coding matrix;
d) verifying the invertible character of the system matrices of the destination nodes;
e) in the event of negative verification, reiterating the steps b) to e) or else inverting the system matrices of the destination nodes;

and said method is interrupted after a predetermined number of negative verifications.

This enables the use of a finite field for the coding, this finite field comprising a larger number of elements, and hence reduces the computation capacities and resources needed.

Advantageously, said method comprises the following steps:

- exchanging encoded data between the nodes of said sub-network in using said network coding;
- in the event of detection of a fault in reception by at least one of said nodes of said sub-network, called a faulty node, reiteration of said method without said faulty node or nodes.

Thus, a simple definition is made of the cases of execution of the method according to the invention (apart from the classic cases of execution, for example when the network is started up and at each change of the topology of the network).

In another embodiment, the invention pertains to a computer program product downloadable from a communications network and/or recorded on a computer-readable carrier and/or executable by a processor, said computer program product comprising program code instructions for the implementation of the above-mentioned method (according to at least one embodiment) when said program is executed on a computer.

In another embodiment, the invention relates to a storage means that is possibly detachable, readable by a computer, storing a set of instructions that can be executed by said computer to implement the above-mentioned method (according to at least one embodiment).

In another embodiment, the invention concerns a device for building a network coding scheme adapted to the transmission of data between a plurality of source nodes and a plurality of destination nodes in a communications network comprising a plurality of nodes, said device comprising:

- means for determining, for each destination node, a first set of source nodes from which there exist disjointed paths, in said communications network, to reach said destination node;
- means for determining a second set of source nodes which is the intersection of the determined first sets of source nodes;
- means for determining a sub-network for implementing the network coding comprising:
  - source nodes which belong only to the second set of source nodes,
  - the plurality of destination nodes, and
  - nodes included in the disjointed paths connecting the source nodes of said second set of source nodes and said destination nodes; and
- means for building a network coding scheme based on said determined sub-network.

Advantageously, the cardinal of each first set of source/nodes is the maximum.

In one particular embodiment, said device comprises means for obtaining a predetermined sequence order indicating the order in which said nodes can access a shared medium included in the communications network, and said first determining means enabling the determining, for each destination node, of a first set of source nodes, comprise:

- means for verifying, for each disjointed path from one of the source nodes up to said destination node, that the order of the nodes forming said disjointed path is consistent with said predetermined sequence order;
- means for obtaining said first set of source nodes in taking only source nodes included in disjointed paths having undergone a positive verification.

Advantageously, said first determining means enabling the determining of a first set of source nodes for each destination node, comprise means for determining the disjointed paths, implementing the Ford Fulkerson search algorithm modified to take account of said verification of consistency with the predetermined sequence order.

According to an advantageous characteristic, said means for building a network coding scheme comprise:

- means for determining a matrix of adjacency of said sub-networks;
- means for determining an coding matrix from said adjacency matrix;
- means for determining a system matrix for each destination node from said coding matrix;
- means for verifying the invertible character of the system matrices of the destination nodes;
- activation means enabling the following:
- in the event of negative verification by said verification means, means for activating said means for determining an adjacency matrix, said means for determining a coding matrix and said means for determining a system matrix,
- in the event of positive verification by said verification means, means for activating inversion of the system matrices of the destination nodes;
- means for interrupting said device after a predetermined number of negative verifications by said verification means.

Advantageously, with encoded data being exchanged between the nodes of said sub-network in using said network coding, said device comprises:

- means for detecting a fault in reception by at least one of said nodes of said sub-network, called a faulty node,
- means for restarting said device without taking account of said faulty node or nodes.

5. LIST OF FIGURES

Figure 4A:
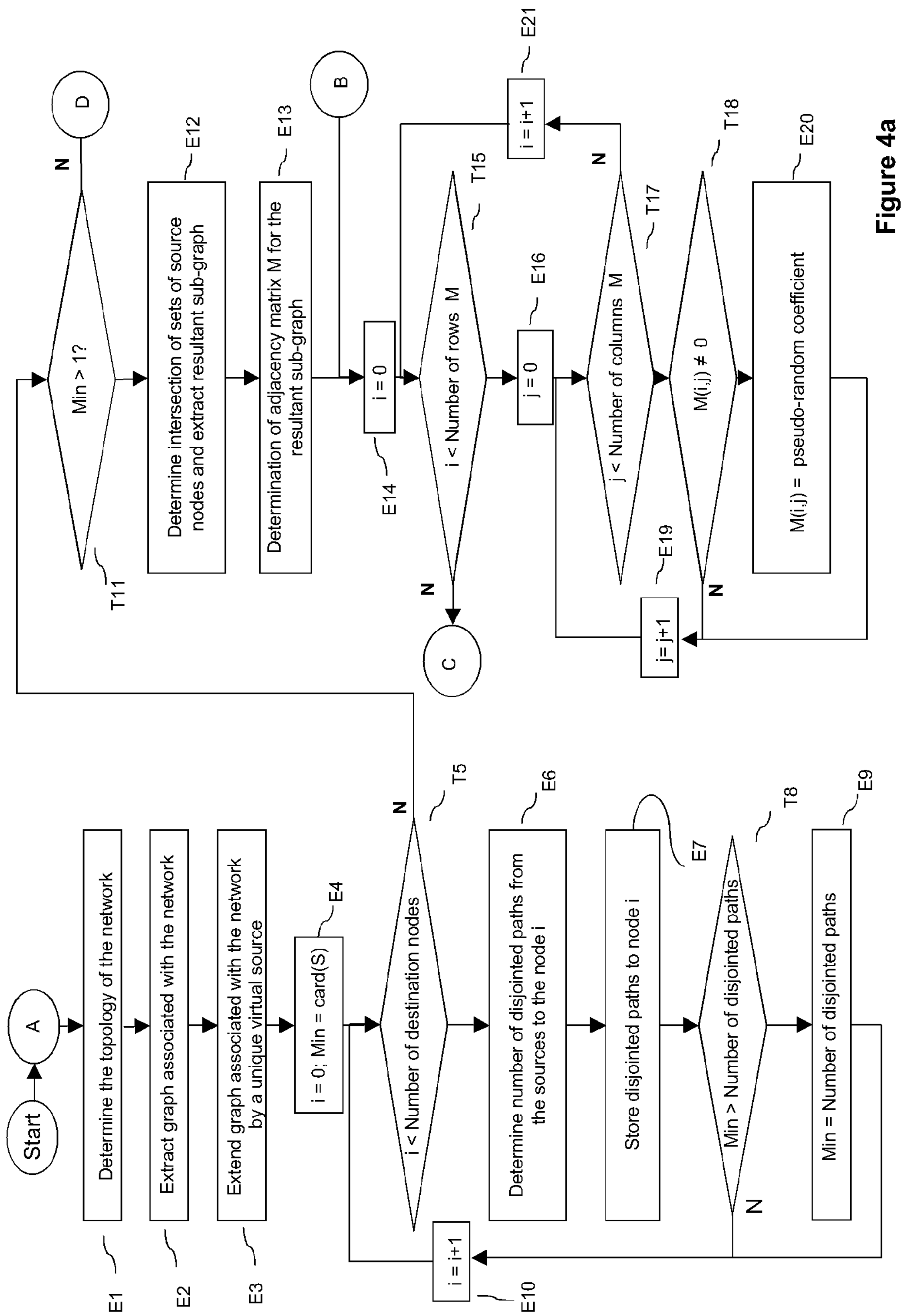
Figure 4B:
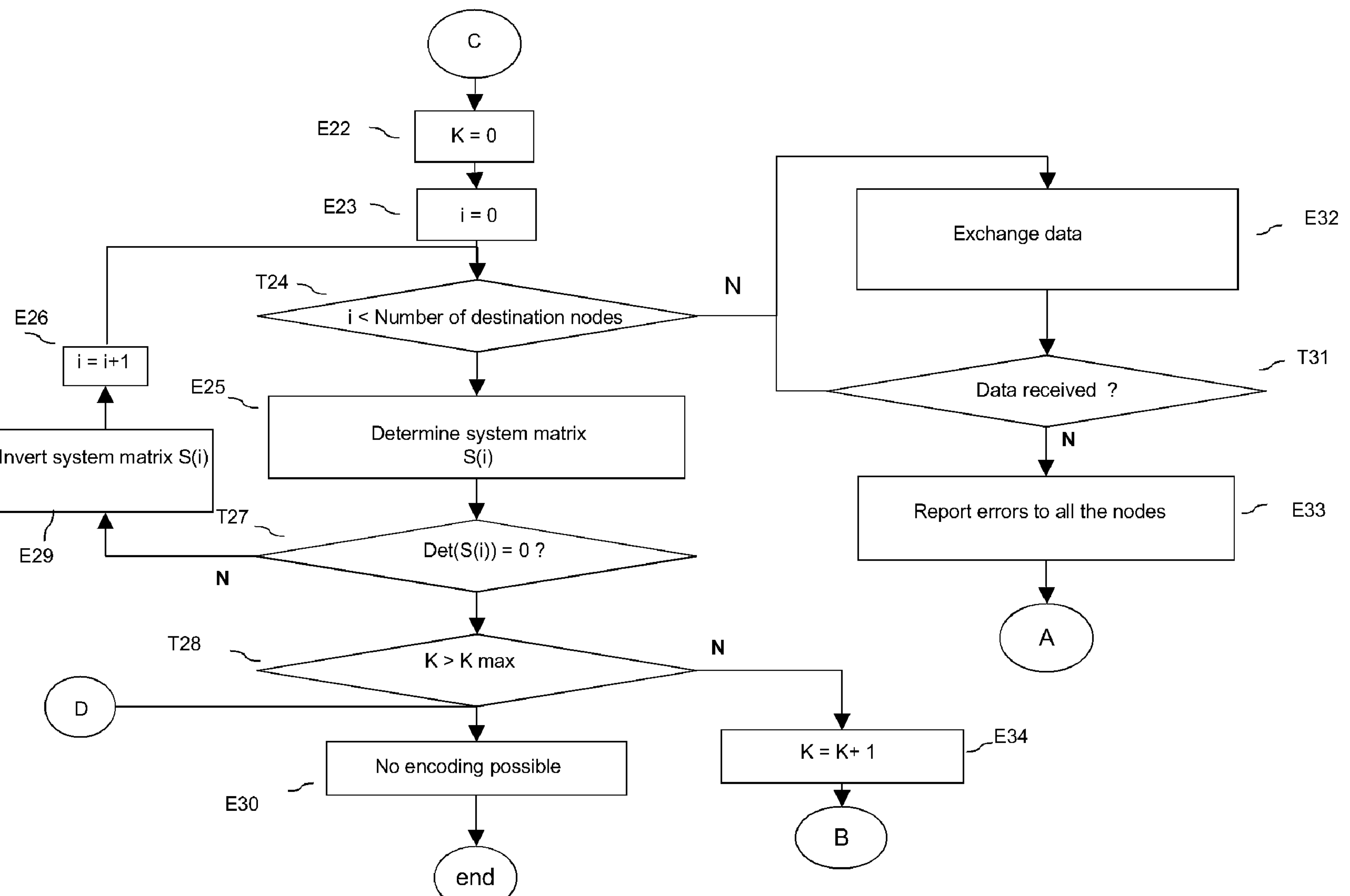
Figure 5:
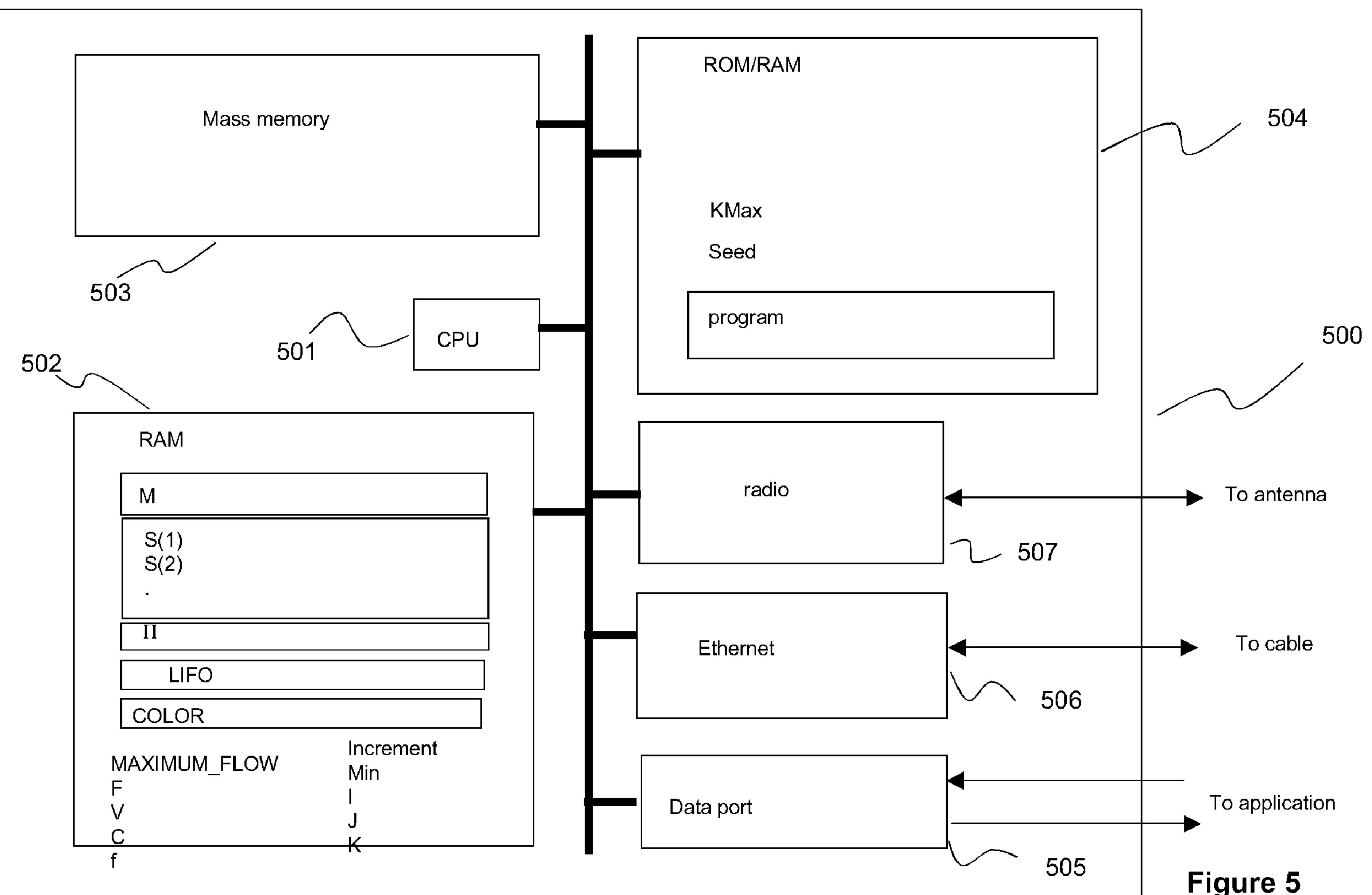
Figure 6A:
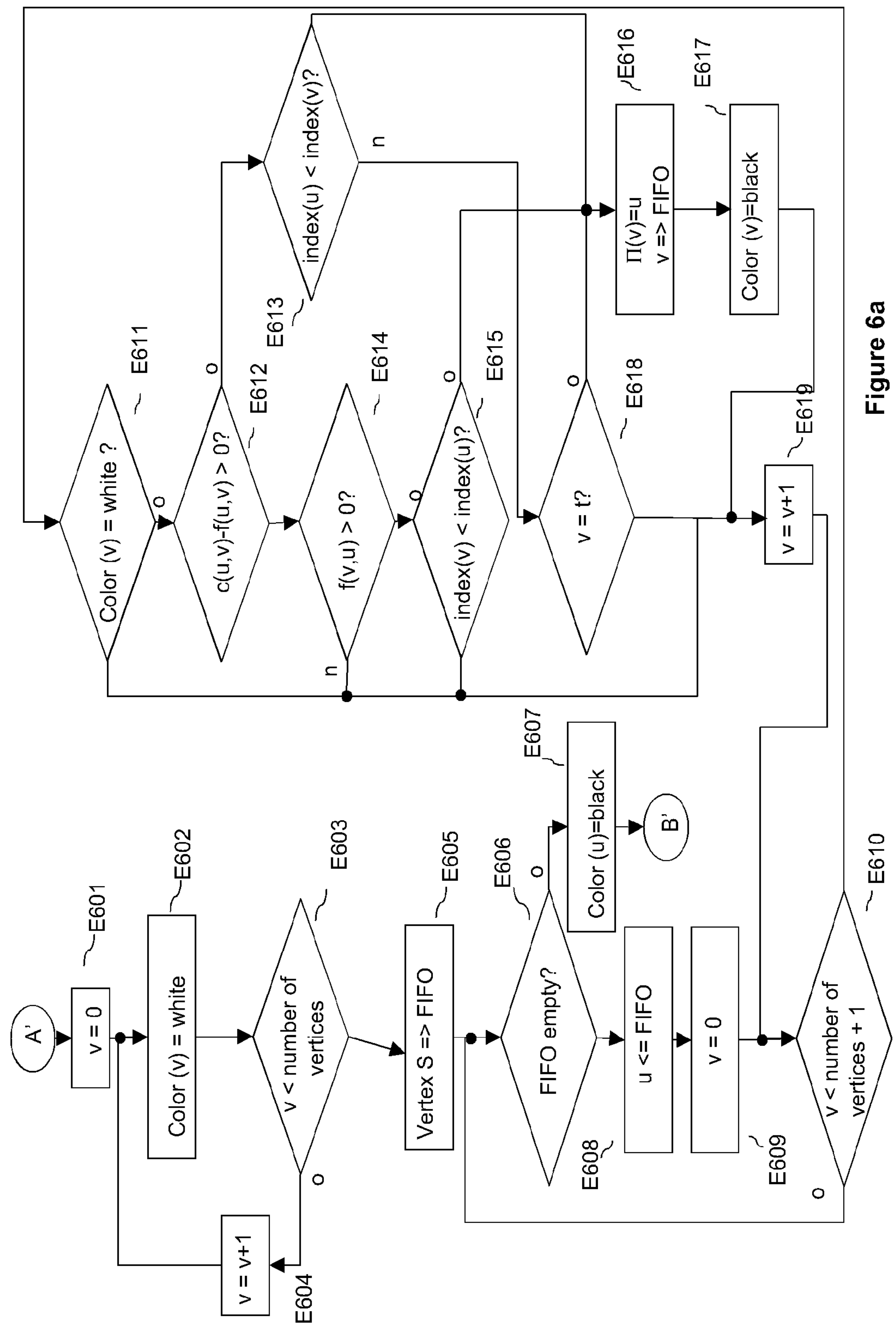
Figure 6B:
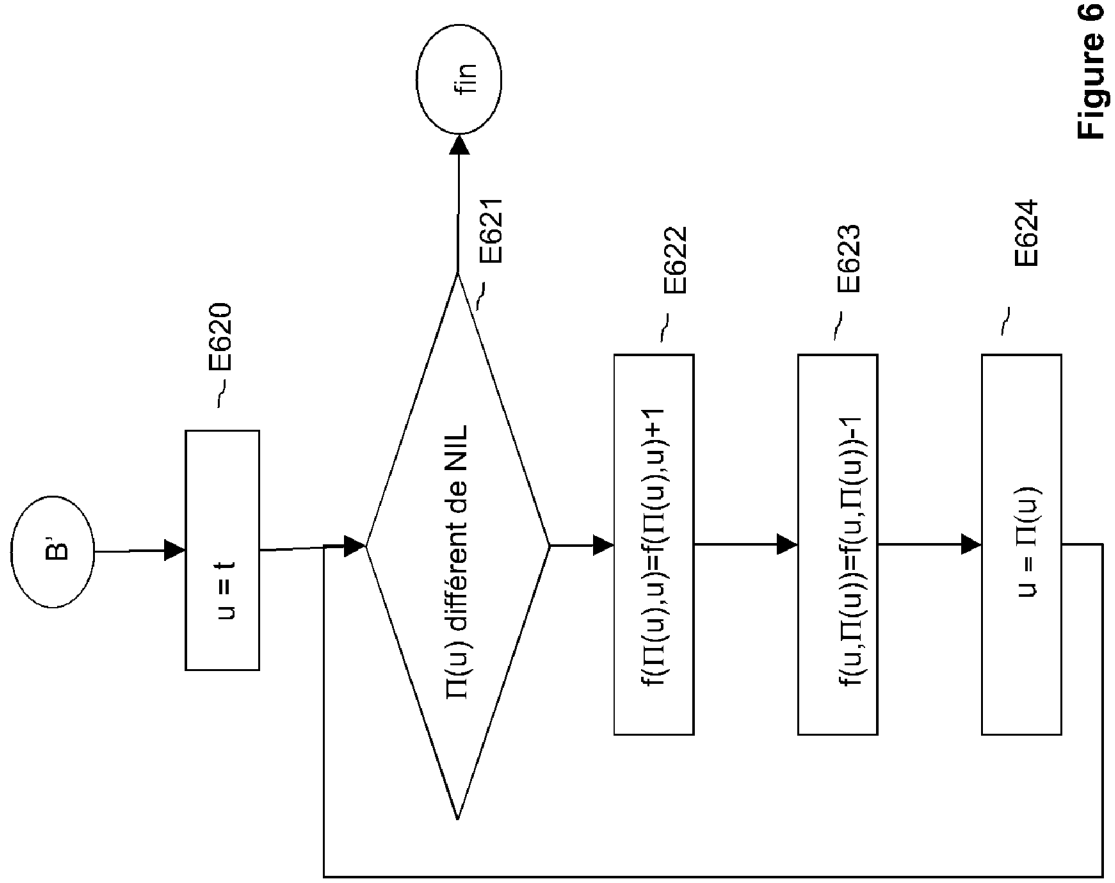

Other features and advantages of embodiments of the invention shall appear from the following description, given by way of an indicative and non-exhaustive and from the appended drawings, of which:

FIGS. 1*a* and 1*b* illustrate a classic (and pedagogical) example of network coding;

FIGS. 2*a*, 2*b* and 2*c* illustrate the problem of implementing a network coding in the classic case of a butterfly network;

FIGS. 3*a* to 3*h* illustrate the result of execution of different steps of the method according to one embodiment of the invention with a network example;

FIGS. 4*a* and 4*b* are flow charts of a particular embodiment of the method according to the invention;

FIG. 5 is a block diagram of a device according to a particular embodiment of the invention;

FIGS. 6*a* and 6*b* are flow charts of a particular embodiment of the step, seen in FIG. 4*a*, for determining disjointed paths (Ford Fulkerson's algorithm adapted to the case of a shared medium).

6. DETAILED DESCRIPTION

In all the figures of the present document, the identical elements and steps are designated by a same numerical reference.

6.1 Method

Referring now to FIGS. 4*a* and 4*b*, we present a particular embodiment of the method according to the invention.

This method can be executed when the network is started up or as soon as there is a change in topology.

The step E1 is the step for capturing the topology of the network. The means used to know the topology of the network are described in paragraph 6.2.1 here below. From the topology, the process also extracts the source and destination nodes and stores them in two lists.

In the step E2, to create the graph, each node has an associated vertex of the graph. If the quality of reception from one node to another is sufficient, then an arc (directed edge) is created between the vertices representing them, the arc is directed towards the reception vertex.

It is possible to consider flows across a graph by designating a source node and a destination node. In order to consider such a flow, we need to define an ability of arcs to carry a flow. This is done by the capacity function c(u, v), which defines an ability to carry flow on an arc between node u and node v.

Such a graph, which may carry a flow, may be represented by an adjacency matrix. An adjacency matrix is a K×K matrix, where K is the number of nodes in the graph. An entry $a_{uv}$ in an adjacency matrix is equal to the capacity function of the arc between u and v, i.e. equal to c(u, v).

In the step E3, the graph obtained is extended by the addition of a virtual source vertex having arcs towards all the multicast source vertices representing source nodes of the real network.

The method now necessitates the exploration of the paths leading from the virtual source to each of the destination nodes. To this end, at the step E4 the process initializes to zero a counter i indexing the destination nodes counted in the list obtained through knowledge of the topology at the step E1, and initializes the capacity of the graph (variable Min) to the total number of real source nodes for which the minimum value is sought. The counter is incremented at the step E10. Its final value (the number of destination nodes) is tested at the step T5.

The step E6 is iterated for each destination node (vertex) and consists of a search for the disjointed paths that lead to that destination node.

In a preferred embodiment of the invention the search consists of finding the maximum number of disjointed paths for a given destination node, even if it is possible to select any number of disjointed paths. In this latter case however, the multicasting throughput may not be maximum.

This search of the maximum number of disjointed paths is performed preferably by using a modified Ford Fulkerson algorithm (described in detail in paragraph 6.2.2 here below).

In the modified Ford Fulkerson algorithm, the capacities of all arcs (u, v) of the extended graph are set equal to one. This algorithm is applicable to the extended graph in which the source node (virtual source node) has no incoming arcs and a destination node (i) has no outgoing arcs.

The Ford Fulkerson algorithm allows computation of a maximum flow between the source node and the destination node. The maximum flow may involve sub-flows passing along different paths and consequently along different arcs.

Due to the setting of the capacities of all the arcs to one, all the paths participating in the maximum flow are disjointed paths. The number of disjointed paths, relatively to destination node i, can thus be computed.

Each time that a maximum flow is obtained, the process stores the disjointed paths of the sub-graph participating in this maximum flow (step E7).

If the number of disjointed paths is smaller than the number stored in the variable Min (test T8), the process replaces this value by the new value at the step E9.

Steps E6 and E7 and test T8 are repeated for all destination nodes.

From each set of disjointed paths determined for a given destination node, a set of real source nodes is obtained corresponding to the source nodes belonging to those disjointed paths and with which the virtual source node has arcs. A set of source nodes is thus obtained for each destination node. The cardinal of each set is equal to the number of disjointed paths for that destination node.

If the minimum Min found after executing the above steps is less or equal to 1 (test T11), then the coding is declared to be impossible and the algorithm jumps directly to the step E30. If not, at the step E12, a resultant set of source nodes is determined by the intersection of the different sets of real source nodes obtained for the different destination nodes.

Each destination node is thus reachable via disjointed paths by all the sources nodes of the determined resultant set. The nodes of the graph involved in all these paths, i.e. participating in the flows coming from the source nodes of the resultant set and reaching all the destination nodes, are determined. They form with the source nodes of the resultant set a resultant sub-graph in which a network coding is to be applied.

To this end, it is possible to use the previously determined disjointed paths between real source nodes participating in the flow and the destination nodes. These paths will have been stored during the previous search. Alternately, it is possible to re-apply the search for disjointed paths made by the Ford Fulkerson algorithm between the real source nodes participating in the flow and the destination nodes.

Then, from the sub-graphs representing these flows, i.e. the resultant sub-graph, the process extracts an adjacency matrix M at the step E13. For example, the matrices describing the flows sub-graphs are added term by term and then the non-zero terms are replaced by a 1 to obtain a non-weighted adjacency matrix (the elements of the adjacency matrix are thus zeros or ones). This matrix is a square matrix and has a dimension corresponding to the number of nodes of the sub-graph.

A coding matrix is afterwards generated from the adjacency matrix. This is performed by assigning, to every non-zero coefficient of the matrix (test T18), a pseudo-random element drawn from the finite field (step E20). Steps E14, E16, E19 and E21, and tests T15 and T17 allow to cover all the coefficients of the matrix. One means for computing this coding matrix is described in paragraph 6.2.3 here below.

Once the exploration of all the rows and all the columns is finished, the process will determine the system matrices corresponding to each destination node. The term "system matrix corresponding to the destination node i" and the notation S(i) are applied to the matrix used to retrieve the packets (or vectors) sent by the source nodes from the packets (or vectors) received by the destination node i. The term "system" herein evokes the linear system to be resolved at the destination node i in order to retrieve the original data. The linear system is resolved by inversion of the matrix S(i).

In order to ascertain that the process has taken place without any problems, a test counter K is set at zero (step E22). Then, in the step E23, a counter i indexing the list of the destination nodes is set. The counter is tested for its final value at the step T24 and incremented at the step E26. The means described in the paragraph 6.2.4 here below, which is an algorithm extracting the matrix S from the matrix M, is used iteratively to obtain the system matrix S(i) of each of the destination nodes (step E25).

The iteration is broken if a matrix S(i) is non-invertible, i.e. if its determinant is zero (test T27) then the process increments the counter K by the number of unsuccessful attempts (E34) and recommences the drawing of random coefficients for the coding matrix (returning to step E14). When there are too many failures (test T28), it may be decided to stop the procedure (step E30) and the network will then make use of the usual routing and the packets will not be combined.

If the matrix S(i) is invertible (test T27), the system matrix S(i) is inverted (step E29) and the counter i is incremented (step 226) before returning to the step T24.

Note: in the prior art, the header of the packet frequently conveys an identifier of the source of the packet. In this invention, if the source takes part in the network coding, the identifiers of the real sources of the packet may, for example, be conveyed in the header as and when the nodes combine several packets. The receiver then knows that it must use the packet in combination with others and that it should rely on the system matrix to retrieve the original information. If the source does not take part in the network coding, the packet is directly exploitable. However, the topology and the order in which the medium is accessed are known. Therefore, the header is redundant. This new means for transporting numerous identifiers can be a precaution against errors.

If all goes well, then after the determining and inversion of all the system matrices (test T24), the set of nodes taking part in the resultant sub-graph can start the exchange of encoded data (step E32).

During the exchange of data, every node of the resultant sub-graph may monitor that the network coding as initially configured is still well adapted to network conditions and it may trigger a reconfiguration of the network coding if necessary. For example, if an insufficient number of packets necessary to correctly encode or decode data is received by one of the participating nodes (test T31), this node can inform all the other nodes of an error and prompt a re-execution of the whole method (step E33).

6.2 Device

The invention can be obtained equally as a program executed on a re-programmable computing machine (a PC, a DSP or a microcontroller) or on a dedicated computing machine (a set of logic gates such as an FPGA or an ASIC).

This program has several algorithms implemented in a distributed fashion.

The computation field used for the algebraic codes is a finite field. The operations of addition and multiplication require means different from those usually encountered in computers, but are known to those skilled in the art.

FIG. 5 illustrates a non-exhaustive embodiment of a device according to the invention 500. This device is a computer, conventionally formed by a central processing unit (CPU) 501, a random-access memory 502, a mass storage memory 503, a read-only memory 504. It also has a data port 505, an Ethernet port 506 and a radio port 507 enabling it to communicate with other elements. The central processing unit 501 executes the program which runs the process. The different variables are stored in the random-access memory 502. The algorithmic means needed are described in detail here below.

6.2.1 Means Used to Know the Topology of the Network

Several embodiments are possible and known to those skilled in the art for knowing the topology of the network, i.e. the exhaustive list of the nodes participating in the network as well as the state of communications between the nodes and the order in which nodes access the shared medium.

This topology can be known to the nodes of the network by construction, if the network is fixed and has a constant number of nodes. This information can also be introduced by the user after the installation of a system.

6.2.2 Distributed Algorithm for Determining Disjointed Paths

The distributed algorithm for determining disjointed paths is described using the following pseudo-code.

Notations:

Π[m]: predecessor of m in the recursion

Π[0]=NIL indicates that there is no predecessor for the root of the recursion.

In the algorithms below, function calls with variable "NIL" are not executed.

G: extended graph of the network, s: virtual source vertex, t: a destination vertex, and c: capacity of arcs.

Modification of the Ford Fulkerson Algorithm:

```
c(u,v)=1 for all adjacent u,v.
Input: the network (G,s,t,c).
Output: a maximum flow f between s and t.
Color [t]= black;
MaxFlowValue =−1 ;
Start
    While Color[t]= black
    start
    1. f(u,v) = 0 for all the adjacent vertices u, v.
    color = white for all the vertices.
    2. Π[0]=NIL ;
    u=s ;
    Breadth-FirstSearch[u] ;
    Maximum_Flow[t];
    MaxFlowValue = MaxFlowValue +1 ;
    end
End
```

The Breadth-First Search takes account the order of access (index) to the shared medium (index), through the following two tests which appear in the pseudo-code below of this Breadth-First Search ("Breadth-FirstSearch [u]"):

testing the condition "index(u)<index(v) or v=t" (see detailed description here below of steps E613 and E618 of FIG. 6); and test the condition "index(u)<index(v)" (see detailed description here below of the step E615 of FIG. 6).

In the first test, the condition verifies the order of sequence of the nodes of the network unless the node to be marked v is the destination node (v=t). Indeed, this node, which is the last node of a path, no longer needs to relay information and benefits from all the copies received.

In a shared medium network, the order in which the nodes access the medium is predefined and known to all the nodes.

Breadth-FirstSearch [u]:

```
Start
    1. While FIFO is not empty u = OffFFO[ ] ;
    For all the nodes v of G
    If color [v] = white and c(u,v)−f(u,v)>0 and
index(u)<index(v) or v=t
    Start
    InFIFO[v] ;
    Π[v]=u ;
    Color [v]= black;
    End
    If color [v] = white and f(v,u)>0 and index(v)<index(u)
    Start
    InFIFO[v] ;
    Π[v]=u ;
    Color [v]= black;
    End
    2. Color[u]= black;
End
```

The maximum flow is simplified, with the increment always being equal to 1 in this problem.

```
Maximum_Flow [u]Start
    f(Π[u],u) = f(Π[u],u) + 1;
    f(u,Π[u]) = f(u,Π[u]) − 1;
    v = Π[u];
    Maximum_Flow [v];
End
```

The above Maximum Flow function is recursive and its stopping criteria is matched when the function is called for variable v that equals 'NIL' (in this context the predecessor of zero).

These algorithms are applied between the virtual source s and each destination node t. The flow obtained is stored along with the sources participating in one of the disjointed paths. A comparison is then made on the values of the maximum flows. The capacity of the network is the absolute minimum of these values of maximum flow. In order that a code may be possible, this minimum should be equal to the number of source nodes that can participate. The participating source nodes are determined as being the intersection of the set of source nodes participating in the disjointed fields.

The data coming from the non-participating source nodes will use orthogonal channels in order to be conveyed.

It can be noted that the solution found is one among others. It must be noted that the problems related to graphs are almost all complete NP (for "non-polynomial", referring to the complexity of an algorithm) problems. Here, we verify one of the possible solutions, which is performed in polynomial time. The obtaining of all the solutions exhaustively is not done in polynomial time.

FIG. 6 explains the above pseudo-code of the modified Ford Fulkerson algorithm. All the vertices of the graph are numbered. Using the terminology loosely, the vertex will be identified with its number v in the following description. The algorithm should be performed to discover all the disjointed paths between the virtual source and the vertices representing the destination nodes. It is therefore applied successively to each pair formed by a virtual source and a destination vertex. The steps E601 to E604 are used to mark all the vertices that have not yet been explored by assigning them the color white at the step E602. At the step E605, the algorithm introduces the initial vertex S (the virtual vertex represents a single source) into the FIFO memory to initialize the process. At the step E606, a test is made to find out if the FIFO is empty, which happens when all the vertices of the graph have been explored.

If the FIFO is not empty, then the variable u is loaded with the content of the FIFO at the step E608 while at the step E609 the variable v is set at zero (the virtual source may have been numbered zero but this is not necessarily so. If this were to be the case, the initial value can be 1).

This variable v represents the other vertices of the graph, and the algorithm makes a test at the step E610 to ascertain that all the vertices have been examined. If the answer is yes, a search must be made for a new starting vertex in the FIFO. If not, a test is made at the step E611 to find out if the vertex has already been marked. A positive response implies that the next vertex should be examined, by increment at the step E619. If there is a negative response, the algorithm must make a test to find out if the capacity of the arc between u and v is greater than the stream which can flow therein (step E612). The capacity is equal to 1 if there is an arc between the vertex u and the vertex v. If not, it is equal to zero. In the prior art this capacity is not limited. A number of changes and simplifications of the Ford Fulkerson algorithm flow from this limitation. A positive response at the step E612 means that the algorithm can then perform a test at the step E613 to find out if the order in which the nodes access the medium is compliant (i.e. whether the condition "index(u)<index(v)" is verified), so as to select only disjointed paths that can be physically set up. Indeed, the algorithm relies on a representation of the network that removes the problem of access to the medium so as to keep only relationships that are possible from one node to another. For example, in a wireless network, the node A is linked to the node B if the distance between A and B is small enough for B to receive a signal with a signal-to-noise ratio such that the demodulation of the signal is possible. If other nodes wish to communicate without interference on the same physical medium, a system of orthogonalization is necessary to ensure access, for example TDM or FDM or a combination of all these means. Even if in an FDM several nodes can access the medium at the same time, for the network coding to work, the message should be received by a node before being encoded and retransmitted. An index is therefore defined for the vertices of the graph which represent the time at which the node corresponding to the vertex can access the medium. The step E613 thus ensures that the message will be received before being encoded and constitutes a remarkable difference as compared with the prior art which is an implementation of the Ford Fulkerson algorithm.

If the response is negative at the step E613, the algorithm ascertains that the vertex tested (v) does not represent the destination node (t) (test of the step E618).

The algorithm computes a path. Its result is used to determine the number of disjointed paths between source and destination. It is therefore executed several times. When it is called again, it should be able to question the paths already set up in the previous calls. To do this, the arc (v, u) is a candidate to be an element of an alternative path. As a consequence, it is assigned a flow equal to −1. During the exploration, if the capacity of the arc between u and v is smaller than or equal to the stream that must flow therein (negative response at the step E612), then the algorithm tests whether the arc (v, u) is a possible path (step E614) and whether the order in which the medium is taken by v and u is compatible with this direction of exploration (i.e. whether the condition "index(v)<index (u)" is verified) (step E615).

If the response is negative at the step E615, the algorithm ascertains that the vertex tested does not represent the destination node (test of the step E118).

A positive response at the step E613, E615 or E618 leads, at the step E616, to the placing of the tested vertex (v) in the FIFO to take account later of the vertices neighboring this vertex. The algorithm must store that vertex which preceded the tested vertex, so that the recursion may function. The algorithm can then mark the vertex as processed and assign it the color black at the step E617. Then the algorithm goes to the next vertex (step E619).

When all the vertices have been processed, then the FIFO is empty (test step E606 again). The algorithm then assigns the initial vertex the color black (step E607).

It is then necessary to update the flows between the vertices. This is again a recursive process which scans the path between the source vertex and the destination vertex, this time from bottom to top. To this end, a variable u is initialized with a number of the destination vertex (t) at the step E620. So long as the current vertex has a predecessor (test E621), the algorithm will add 1 to the value of the flow between u and its predecessor (E622) and deduct 1 from the value of the flow between its predecessor and u (step E623). Then the predecessor becomes the current vertex (step E624). When there is no longer any predecessor (test step E621), the process of updating the flows stops.

6.2.3 Algorithm for Computing the Network Coding and Assigning Coding Coefficients An algorithm is used to set up the coding matrix of the network obtained beforehand. The number of coefficients to be drawn is indicated by the rows of the matrix. A pseudo-random generator at output in the finite field is used. A generator of this kind is obtained for example by making a bijection between the outputs of a generator according to a normal law reduced to an interval [1 q] in the set of integers (see the above-mentioned patent application: US2005/0152391, M. Effros, T. Ho, R. Koetter, M. Médard, D. Karger "Randomized Distributed Network Coding"), then in taking the element of the finite field corresponding to the bijection. Since all the nodes have the same starting point for the draws, they will all successively draw exactly the same coefficients. It is possible, as a storage means, to use an adjacency matrix in which the unit coefficients indicating a arc will be replaced by the coefficients of the pseudo-random code. Indeed, the identity of coefficients leads to identical adjacency matrices for all network nodes.

6.2.4 Algorithm for Computing Resolution Matrices of the Linear Systems Built by Network Coding It is possible that the number of incoming arcs in a destination node is greater than the number of sources. There is then a redundancy. The computation device proposed here above advantageously eliminates this redundancy. When the maximum number of sources is n, the system matrices obtained are n-ranked squares. The system matrix of a node is used to retrieve the data sent out by the sources on the basis of the data received at the destination node.

The following algorithm is used to build a matrix S(J) associated with the destination node J. This algorithm is therefore to be used for all the destination nodes. It is based on a variation of the "depth first search", which is a well known algorithm for the exploration of graphs.

Notations:

F: coding square matrix sized N constituting the input of the pseudo-code;

1f, cf: rows and columns of the matrix F;

J: index of the destination code;

M(J): system matrix associated with the node J given at output;

LM, CM: rows and columns of the matrix M (dimension of M=Number of sources×Number of sources), Π[m]: predecessor of m in the recursion the variables in lower case correspond to local variables while those in upper case correspond to overall variables.

Pseudo-Code:

```
Input: F
Output: M
Start
COEF =1.
M(LM,CM) = 0 for LM,CM from M to Number_of_sources
For lf= 1 to N
      Start
      COEFMEM(lf)=0 ;
End
LM=Number of sources ;
CM=Number of sources ;
Collection(J)
End
```

Collection(cf):

```
Start
lf=N ;
while lf > 0
      start
      If F(lf, cf)=0
            lf = lf −1 ;
      Else
      COEFMEM(lf)= COEF;
      COEF = F(lf, Cf) . COEF
      Collection (lf) ;
            If      cf = J      //there is a return to the initial
column
start
LM = LM −1
                  For lf= 1 to N      COEFMEM(lf)=0 ;
                  COEF = 1 ;
End if
lf = lf −1 ;
            End if
End while.
If cf belongs to the list of sources
start
CM= index_in_list_sources(cf) ;
      M(LM,CM ) = M(LM,CM)+ COEF ;
            COEF= COEFMEM(cf) ;
End if
End collection
```

In this algorithm, the matrix M is explored in starting with the last column. When the coefficient is not zero, it is used to compute one of the coefficients of the matrix S. This algorithm is recursive and uses breadth-first search too but from bottom to top. The operation determines which coefficient of the matrix X corresponding to the destination node i has been obtained when the algorithm leads to a source, at the first row of M.

The matrix S should have a non-zero determinant, otherwise it is not invertible. The probability of this latter event depends of course on the inverse of the dimension of the finite field from which the coefficients have come and on the number of coefficients in the product. Indeed, in a multiple product it is enough that only two of the coefficients should form a zero product for the entire product to be zero. Furthermore, a number having been drawn by chance from the finite field, there is one chance relative to the dimension of the field that its complementary value will be drawn. Hence, this probability tends towards zero when the dimension increases, but be that as it may, if the determinant is zero, the step for drawing the coefficients has to be restarted. This further diminishes the probability of coefficients leading to a zero determinant being drawn again.

It is necessary to limit the number of reiterations of the step for drawing the coefficients. Indeed, if the determinant of the matrix remains zero after several consecutive trials, it means then that it is certain that an error has entered during the preceding steps. It will be easy then to conclude that the network coding cannot be done and therefore that a traditional routing should be used.

The inversion will be done by many possible algorithms, in transposing the computations in the finite field. A certain number of these algorithms is listed in the following reference: W. Press, S. Teukolsky, W. Vetterling, B. Flannery, "*Numerical recipes in C*", Cambridge University Press $2^{nd}$ ed. 1992.

The order of the rows of the system matrix is arbitrary. The messages coming from the previous nodes should be taken into consideration in the same order.

6.3 Example

FIGS. 3*a* to 3*h* show the steps for searching disjointed paths in the execution of the algorithm.

FIG. 3*a* illustrates the result of the first and second steps of the method (steps E1 and E2 of FIG. 4*a*). The graph G associated with a network has been collected and increased by a virtual source S. A, B and G are the source nodes of the real network, E and F are the destination nodes.

Figure 3D:
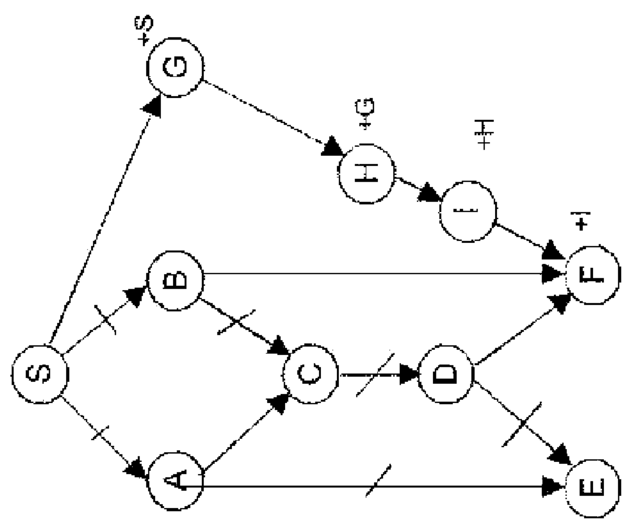
Figure 3C:
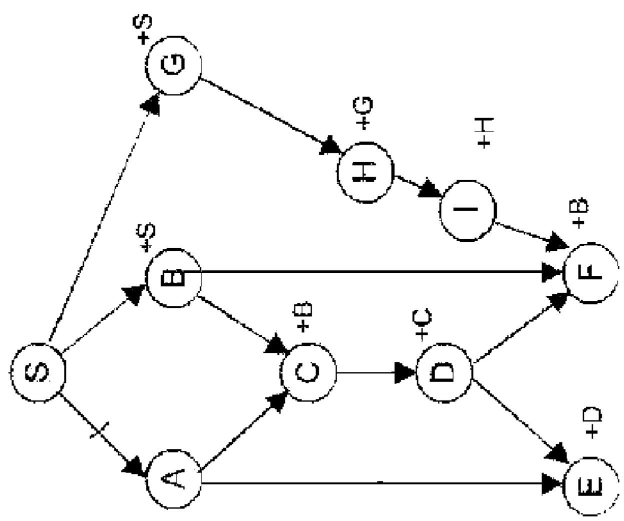
Figure 3B:
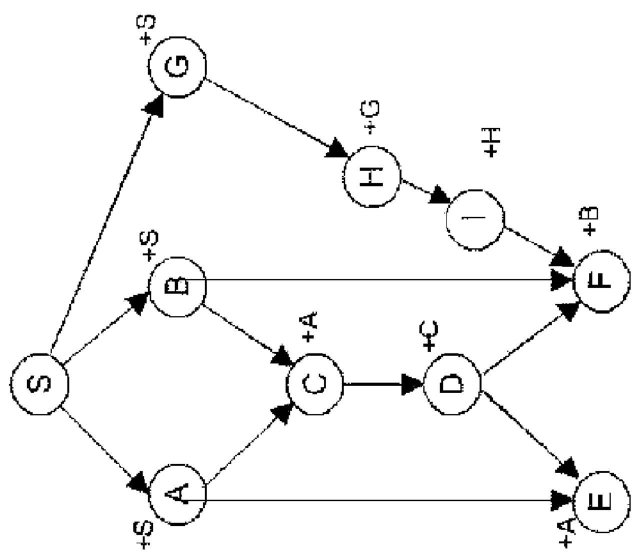
Figure 3G:
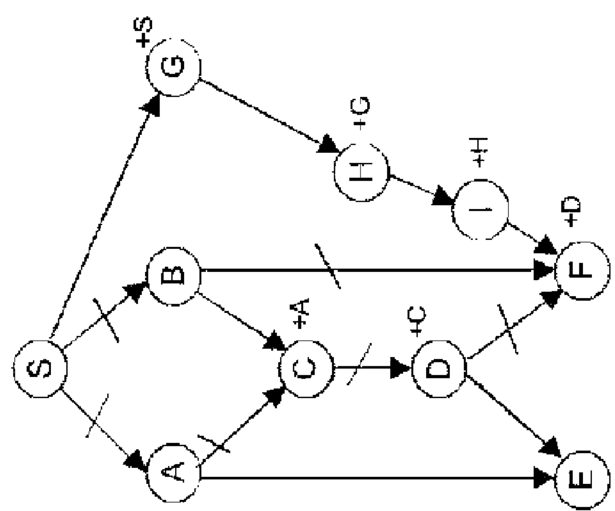
Figure 3F:
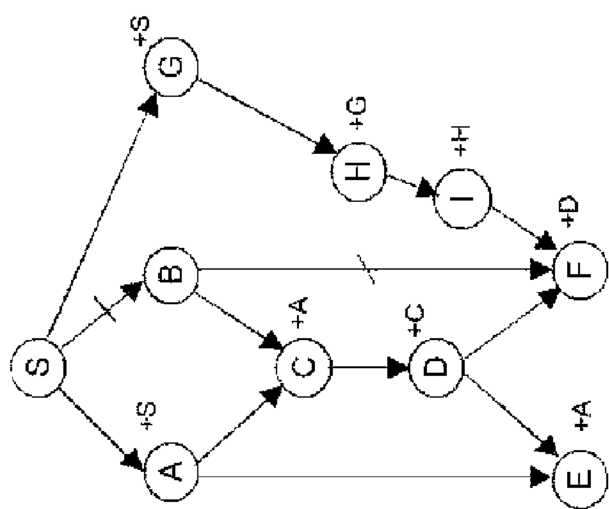
Figure 3E:
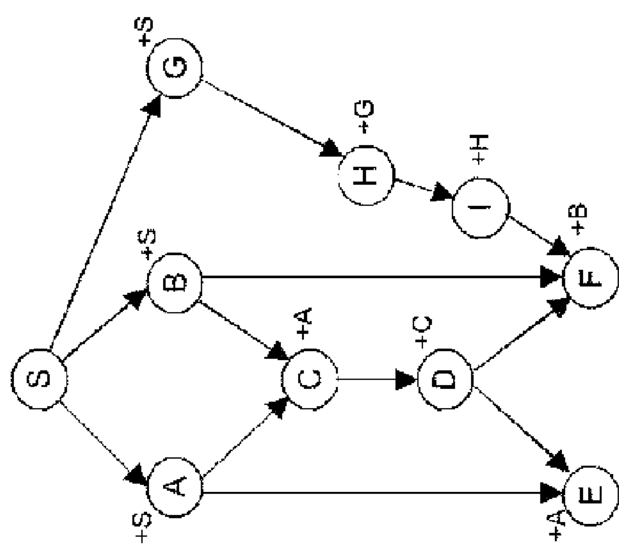
Figure 3H:
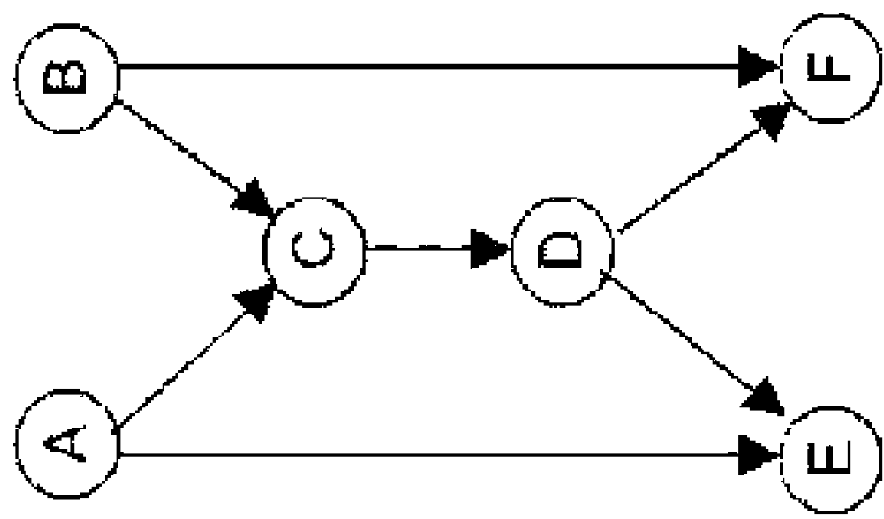

FIGS. 3*b* to 3*h* illustrate the application of the modified Ford Fulkerson algorithm. To have a better view of the action of the algorithm, the predecessors Π[ ] of the nodes are used as marks and replace the color function of the Breadth-First Search algorithm. The increasing or decreasing of capacity possible is identified by the + or − sign before the letter indicating the predecessor. Then, the first path starting from the destination node E and going back to the source is set up. In FIG. 3*c*, the flow is equal to 1. Hence the residual capacity is zero on the arcs of the path. This is illustrated by a line crossing the arcs which are henceforth counted. The following marking process is indicated. In FIG. 3*d*, the disjointed path is counted and the last marking leading to the marking of the node E is done. The maximum flow is therefore two. Henceforth, the disjointed paths linking the source to the destination node F are counted. In FIG. 3*e*, the first marking is finished. In FIG. 3*f*, the first path is counted and the next marking is done. In FIG. 3*g*, the second and third paths are indicated at the same time as the marking after the counting of the second disjointed path. This time, the maximum flow is three. We have therefore counted a maximum flow of two and a maximum flow of three whereas there are three sources. The conclusion is that it is not possible to apply network coding to all three sources. The disjointed paths include the sources A and B but not the source G. This source will therefore not participate in the network code. FIG. 3*h* indicates the path chosen, and this is the famous example of the butterfly network. In this example, there is no negative marking.

The adjacency matrix of this network is the following, according to the order of access to the medium, A B C D E F:

$$\begin{bmatrix} 0 & 0 & 1 & 0 & 1 & 0 \\ 0 & 0 & 1 & 0 & 0 & 1 \\ 0 & 0 & 0 & 1 & 0 & 0 \\ 0 & 0 & 0 & 0 & 1 & 1 \\ 0 & 0 & 0 & 0 & 0 & 0 \\ 0 & 0 & 0 & 0 & 0 & 0 \end{bmatrix}$$

The pseudo-random coefficients are then drawn, and the same coefficient is assigned to the arcs coming out of the same node. The coding matrix is obtained:

$$\begin{bmatrix} 0 & 0 & \alpha & 0 & \alpha & 0 \\ 0 & 0 & \beta & 0 & 0 & \beta \\ 0 & 0 & 0 & \chi & 0 & 0 \\ 0 & 0 & 0 & 0 & \delta & \delta \\ 0 & 0 & 0 & 0 & 0 & 0 \\ 0 & 0 & 0 & 0 & 0 & 0 \end{bmatrix}$$

The algorithm then scans the columns of this matrix in focusing on the destination nodes E and F to determine their system. The operation then starts from the columns associated with the destination nodes. For the column of E, the coefficient α and the coefficient δ corresponding to the nodes A and D are found. A is a source whose first source/destination path is complete. D is a relay linked to C which is linked to the two sources A and B. Respectively, the two paths starting from A and B are associated with the coefficients δ.χ.α and δ.χ.β. The system matrix of E is therefore the inverse of:

$$\begin{bmatrix} \alpha\chi\delta & \beta\chi\delta \\ \alpha & 0 \end{bmatrix}$$

It must be ascertained that the determinant is not zero. The determinant here is αδχβ. It is therefore necessary that the pseudo-random draw should not have produced numbers whose product is zero. In a field such as $F(2^{1500})$, this probability is 4/1500, i.e. 1/375. The occurrence of the zero matrix event is not negligible and justifies the verification. For the column of F, we find the coefficient β and the coefficient δ. B is a source whose first source/destination path is complete. D is a relay connected to C which is connected to the two sources A and B. Respectively, the two paths leaving A and B are associated with the coefficients δ.χ.α and δ.χ.β. The system matrix of F is therefore the inverse of:

$$\begin{bmatrix} \alpha\chi\delta & \beta\chi\delta \\ 0 & \beta \end{bmatrix}$$

We therefore see the gain in time as compared with a classic routing. In the classic routing, A would have transmitted to E and then to C. C would have transmitted to D, then D would have transmitted to F. B would have transmitted to F then to C. C would have transmitted to D, then D would have transmitted to E. The medium has to be accessed eight times in order to convey the information. In the encoded system, it is necessary for the medium to be accessed four times (A speaks, B speaks, C speaks, D speaks).

Appendix: Use of the Ford Fulkerson Algorithm to Obtain the Number of Disjointed Paths Given directed graph G=(S, A). Let s be a source vertex (s does not have any incoming arc), let t be a sink vertex (t does not have any outgoing arc).

For each pair of vertices {u, v} belonging to A, (u, v) denotes the arc starting at u and finishing at v.

An integer C (u, v) is defined, this integer defining a capacity (zero if there is no arc between u and v, i.e. if (u, v) does not belong to A).

A flow is an application f of S×S to the set of positive integers or zero, such that:

1—For all u, all v belonging to S, $f(u,v) \leqq c(u,v)$.

2—For each vertex belonging to S\{s,t}, the sum of the incoming flows is equal to the sum of the outgoing flows.

3—For all u, all v belonging to S\{s,t} and adjacent values, $f(u,v)=-f(v,u)$.

A saturated flow is a flow f(u,v) equal to the capacity c(u,v), (u,v) belonging to A, (the set (G,s,t,c) denotes a network.

Ford Fulkerson Algorithm (1956)

```
Input: the network (G,s,t,c).
Output: a maximum flow f between s and t.
Color [t]= black;
MaxFlowValue =−1 ;
Start
    While Color[t]= black
    start
    1. f(u,v) = 0 for all the adjacent vertices u, v.
    color = white for all the vertices.
    2. Π[0]=NIL ;
    u=s ;
    Breadth-FirstSearch[u] ;
    Maximum__Flow[t];
    MaxFlowValue = MaxFlowValue +1 ;
    end
End
```

The fact of exploring the graph in width and in order of relationship implies the use of a LIFO (Last In First Out) memory to memorize the descendants of a node having the same parenthood. The description of these operations in a memory is given by

```
Initialization :
i=0 ;
k=0 ;
InFIFO[v]
Start
    FIFO[i]=v ;
    i=i+1
End
OffFIFO[ ]
Start
    FIFO[i];
K=k+1;
End
```

Breadth-FirstSearch [u]

```
Start
    1.While FIFO is not empty u = OffFFO[ ] ;
    For all the nodes v of G
    If color [v] = white and c(u,v)−f(u,v)>0
    Start
```

-continued

```
            InFIFO[v];
            Π[v]=u;
            Color [v]= black;
            End
            2. Color [u]= black;
        End
```

Increment[t]

```
Start
    increment = minimum(increment, c(Π[u], u) − f [Π[u],u));
    v=Π[u];
    Increment[v];
End;
```

Maximum_Flow [u]

```
Start
    f(Π[u],u) = f(Π[u],u)+ increment;
    f(u,Π[u]) = f(u,Π[u])− increment;
    v = Π[u];
    Maximum__Flow [v];
End ;
```

This algorithm uses known techniques of graph exploration. The first technique is that of recursion. The algorithm is applied identically to all the vertices as and when they are taken into account. The letter Π contains the predecessor vertex (also called parent vertex) of the vertex being processed. The second technique is a technique for the marking of the vertices being executed, to find out if the vertex has been taken into account or not. Here, the marking is represented by the color of the vertex: black if already processed, white if not. Finally, there are only two ways of processing recursion, it is possible to explore an entire branch from top to bottom or from bottom to top (Depth First Search) or it is possible from a same vertex to explore all the immediately adjacent vertices (Breadth First Search). It is the last-named method that is used here. The term "flow" is used to represent any throughput rate flowing in the same direction, whether it is cars, goods, electricity in a circuit, messages etc because the applications of this algorithm are not limited to information theory.

What is claimed is:

1. Method for building a network coding scheme to be used for the exchange of encoded data between a plurality of source nodes and a plurality of destination nodes in a communications network comprising a plurality of nodes, wherein said method comprises the following steps:

for each destination node, determining a first set of source nodes from which there exist disjointed paths, in said communications network, to reach said destination node;

determining a second set of source nodes which is the intersection of the determined first sets of source nodes;

determining a sub-network for implementing the network coding comprising:

source nodes which belong only to the second set of source nodes, the plurality of destination nodes, and nodes included in the disjointed paths connecting the source nodes of said second set of source nodes and said destination nodes; and building a network coding scheme based on said determined sub-network.

2. Method according to claim 1, wherein the cardinal number of each first set of source nodes is the maximum.

3. Method according to claim 1, further comprising a step for obtaining a predetermined sequence order indicating the order in which said nodes can access a shared medium included in the communications network, and wherein step for determining a first set of source nodes, for each destination node, comprises the following steps:

verifying, for each disjointed path from one of the source nodes up to said destination node, that the order of the nodes forming said disjointed path is consistent with said predetermined sequence order;

obtaining said first set of source nodes in taking only source nodes included in disjointed paths having undergone a positive verification.

4. Method according to claim 3, wherein said step for determining a first set of source nodes, for each destination node, comprises a step for determining the disjointed paths, based on the Ford Fulkerson search algorithm modified to take account of said step of verification of consistency with the predetermined sequence order.

5. Method according to claim 1, wherein said step for building a network coding comprises the following steps:

a) determining a matrix of adjacency of said sub-networks;

b) determining a coding matrix from said adjacency matrix;

c) determining a system matrix for each destination node from said coding matrix;

d) verifying the invertible character of the system matrices of the destination nodes;

e) in the event of negative verification, reiterating the steps b) to e), or else inversion of the system matrices of the destination nodes;

and wherein said method is interrupted after a predetermined number of negative verifications.

6. Method according to claim 1, further comprising:

in the event of detection of a fault in reception by at least one of said nodes of said sub-network, called a faulty node, reiteration of said method without said faulty node or nodes.

7. A Non-transitory computer-readable medium storing a set of instructions that can be executed by said computer to implement a method for building a network coding scheme to be used for the exchange of encoded data between a plurality of source nodes and a plurality of destination nodes in a communications network comprising a plurality of nodes, wherein said method comprises the following steps:

for each destination node, determining a first set of source nodes from which there exist disjointed paths, in said communications network, to reach said destination node;

determining a second set of source nodes which is the intersection of the determined first sets of source nodes;

determining a sub-network for implementing the network coding comprising:

source nodes which belong only to the second set of source nodes, the plurality of destination nodes, and nodes included in the disjointed paths connecting the source nodes of said second set of source nodes and said destination nodes; and building a network coding scheme based on said determined sub-network.

8. Device for building a network coding scheme to be used for the exchange of encoded data between a plurality of source nodes and a plurality of destination nodes in a communications network comprising a plurality of nodes, wherein said device comprises:

means for determining, for each destination node, a first set of source nodes from which there exist disjointed paths, in said communications network, to reach said destination node;

means for determining a second set of source nodes which is the intersection of the determined first sets of source nodes;

means for determining a sub-network for implementing the network coding comprising:

source nodes which belong only to the second set of source nodes, the plurality of destination nodes, and nodes included in the disjointed paths connecting the source nodes of said second set of source nodes and said destination nodes; and means for building a network coding scheme based on said determined sub-network.

9. Device according to claim 8, wherein the cardinal number of each first set of source nodes is the maximum.

10. Device according to claim 8, further comprising means for obtaining a predetermined sequence order indicating the order in which said nodes can access a shared medium included in the communications network, and wherein said means for determining, for each destination node, a first set of source nodes, comprise:

means for verifying, for each disjointed path from one of the source nodes up to said destination node, that the order of the nodes forming said disjointed path is consistent with said predetermined sequence order;

means for obtaining said first set of source nodes in taking only source nodes included in disjointed paths having undergone a positive verification.

11. Device according to claim 10, wherein said means for determining a first set of source nodes for each destination node, comprise means for determining the disjointed paths, implementing the Ford Fulkerson search algorithm modified to take account of said verification of consistency with the predetermined sequence order.

12. Device according to claim 8, wherein said means for building a network coding scheme comprise:

means for determining a matrix of adjacency of said sub-networks;

means for determining a coding matrix from said adjacency matrix;

means for determining a system matrix for each destination node from said coding matrix;

means for verifying the invertible character of the system matrices of the destination nodes;

activation means enabling the following:

in the event of negative verification by said verification means, means for activating said means for determining an adjacency matrix, said means for determining a coding matrix and said means for determining a system matrix, in the event of positive verification by said means for verifying, means for activating inversion of the system matrices of the destination nodes;

means for interrupting said device after a predetermined number of negative verifications by said means for verifying.

13. Device according to claim 8, further comprising:

means for detecting a fault in reception by at least one of said nodes of said sub-network, called a faulty node means for restarting said device without taking account of said faulty node or nodes.

* * * * *